(12) United States Patent
Han et al.

(10) Patent No.: US 8,843,529 B2
(45) Date of Patent: Sep. 23, 2014

(54) DISPLAY INFORMATION CONTROLLING APPARATUS AND METHOD

(75) Inventors: Jae Joon Han, Seoul (KR); Chang Kyu Choi, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 437 days.

(21) Appl. No.: 12/585,383

(22) Filed: Sep. 14, 2009

(65) Prior Publication Data

US 2010/0185681 A1 Jul. 22, 2010

(30) Foreign Application Priority Data

Jan. 19, 2009 (KR) .................. 10-2009-0004053

(51) Int. Cl.
*G06F 17/30* (2006.01)
*G06F 3/0481* (2013.01)

(52) U.S. Cl.
CPC ................................ *G06F 3/04817* (2013.01)
USPC ......................................... 707/805; 715/764

(58) Field of Classification Search
USPC ......... 707/796, 802, 804, 805, 812, 825, 826, 707/913–918; 715/700, 716, 718, 744, 762, 715/764
See application file for complete search history.

(56) References Cited

U.S. PATENT DOCUMENTS

| | | | |
|---|---|---|---|
| 2006/0020661 A1* | 1/2006 | Rhim et al. | 709/203 |
| 2007/0160345 A1* | 7/2007 | Sakai et al. | 386/95 |
| 2007/0220431 A1* | 9/2007 | Nakamura et al. | 715/716 |
| 2008/0034302 A1* | 2/2008 | Ryu et al. | 715/763 |
| 2008/0092040 A1* | 4/2008 | Nakamura | 715/273 |
| 2008/0228734 A1* | 9/2008 | Kang | 707/3 |

FOREIGN PATENT DOCUMENTS

| | | |
|---|---|---|
| JP | 11-282596 | 10/1999 |
| JP | 2007-328457 | 12/2007 |
| JP | 2008-159180 | 7/2008 |
| KR | 10-2007-0038501 | 4/2007 |
| KR | 10-2008-0078081 | 8/2008 |
| WO | 02/078328 A1 | 10/2002 |

OTHER PUBLICATIONS

Eric Horvitz et al., Display of Information for Time-Critical Decision Making, Aug. 1995, ACM, 10 pages.*
Japanese Office Action issued Dec. 3, 2013 in Japanese Patent Application No. 2009-273704.

* cited by examiner

*Primary Examiner* — Jean B Fleurantin
(74) *Attorney, Agent, or Firm* — Staas & Halsey LLP

(57) ABSTRACT

A display information controlling apparatus and method are provided. The display information controlling apparatus may select at least one object from one or more objects based on a location of each of the one or more objects on a display and a location on the display corresponding to a user input signal. The display information controlling apparatus may perform a predetermined operation corresponding to the selected at least one object.

64 Claims, 7 Drawing Sheets

DISPLAY INFORMATION CONTROLLING APPARATUS AND METHOD

CROSS-REFERENCE TO RELATED APPLICATIONS

This application claims the benefit of Korean Patent Application No. 10-2009-0004053, filed on Jan. 19, 2009, in the Korean Intellectual Property Office, the disclosure of which is incorporated herein by reference.

BACKGROUND

1. Field

One or more embodiments relate to an apparatus and method for controlling display information, and more particularly, to an apparatus and method for controlling display information that may intuitively process one or more objects displayed on a display.

2. Description of the Related Art

Currently, with the diversification of functions for electronic devices, users may perform various operations using the electronic device. For example, the user may play a media file using the electronic device to listen to music, to view a motion picture, and the like. Also, the user may open an image file to view pictures or photos that may be stored on the electronic device. The user may also desire to verify the content of a document file, or may edit the document file, using the electronic device.

When the user desires to execute a file stored in a terminal, for example, the user may need to first select the file to be executed. In this instance, the user may be able to select the file based on only limited information for the file, such as the name of the file and the like.

For example, when the user desires to play a media file, the example terminal may display any available tag storing information that may be associated with the media file, such as a title, a singer, an actor, and the like, so that the user may visually review the information of the tag. The user may then retrieve the media file to be played using the information included in the tag.

SUMMARY

According to an aspect of one or more embodiments, there may be provided an apparatus for controlling display information, the apparatus including a display unit to display at least one object on a display, a selection unit to select the at least one object based on a first comparison of a defined first region corresponding to the at least one object and a second region representing a position of the display as defined by an input device, and a control unit to institute a predetermined operation with information represented by the selected at least one object based on a second comparison of the defined first region and the second region while the at least one object is maintained selected.

According to an aspect of one or more embodiments, there may be provided a method of controlling display information, the method including displaying at least one object on a display, selecting the at least one object based on a first comparison of a defined first region corresponding to the at least one object and a second region representing a position of the display as defined by an input device, and instituting a predetermined operation with information represented by the selected at least one object based on a second comparison of the defined first region and the second region while the at least one object is maintained selected.

According to an aspect of one or more embodiments, there may be provided an apparatus for controlling display information, the apparatus including a display unit to display at least one object on a display, a selection unit to select the at least one object based on comparison of a defined first region corresponding to the at least one object and a second region representing a position of the display as defined by an input device, and a control unit to institute a predetermined operation with information represented by the selected at least one object while the at least one object is maintained selected, with the predetermined operation including dynamically changing control of the information represented by the selected at least one object based on a relative changing of the position of the second region while the first region and the second region continuously overlap.

According to an aspect of one or more embodiments, there may be provided an apparatus for controlling display information, the apparatus including a display unit to display plural objects on a display, a selection unit to determine whether a first object and a second object, of the plural objects on the display, are within a threshold distance of each other, to collectively select the first object and the second object based on a comparison of a defined first region, corresponding to a combination of separate defined first regions of the first object and the second object, and a second region representing a position of the display as defined by an input device when a result of the determination indicates that the first object and the second object are within the threshold distance of each other, and to singularly select only one of the first object and the second object based on a comparison of a defined first region of only one of the defined first regions of the first object and the second object and the second region when the result of the determination indicates that the first object and the second object are not within the threshold distance of each other, and a control unit to institute a predetermined operation with information represented by one or more objects selected by the selection unit while the one or more selected objects are maintained selected.

According to an aspect of one or more embodiments, there may be provided an apparatus for controlling display information, the apparatus including a display unit to display at least one object on a display, a selection unit to perform a first selection of the at least one object based on comparison of a defined first region corresponding to the at least one object and a second region representing a position of the display as defined by a first input device, and a control unit to institute a predetermined operation with information represented by the selected at least one object, the predetermined operation being based on control by a second input device and a comparison of the defined first region and another second region representing a position of the display as defined by the second input device while the at least one object is maintained selected.

According to an aspect of one or more embodiments, there may be provided a method for controlling display information, the method including displaying at least one object, selecting the at least one object based on comparison of a defined first region corresponding to the at least one object and a second region representing a position of the display as defined by an input device, and instituting a predetermined operation with information represented by the selected at least one object while the at least one object is maintained selected, with the predetermined operation including dynamically changing control of the information represented by the selected at least one object based on a relative changing of the position of the second region while the first region and the second region continuously overlap.

According to an aspect of one or more embodiments, there may be provided a method for controlling display information, the method including displaying plural objects, determining whether a first object and a second object, of the plural objects, are within a threshold distance of each other, collectively select the first object and the second object based on a comparison of a defined first region, corresponding to a combination of separate defined first regions of the first object and the second object, and a second region representing a position of a display as defined by an input device when a result of the determination indicates that the first object and the second object are within the threshold distance of each other, singularly selecting only one of the first object and the second object based on a comparison of a defined first region of only one of the defined first regions of the first object and the second object and the second region when the result of the determination indicates that the first object and the second object are not within the threshold distance of each other, and instituting a predetermined operation with information represented by one or more selected objects while the one or more selected objects are maintained selected.

According to an aspect of one or more embodiments, there may be provided a method for controlling display information, the method including displaying at least one object, performing a first selection of the at least one object based on comparison of a defined first region corresponding to the at least one object and a second region representing a position of a display as defined by a first input device, and instituting a predetermined operation with information represented by the selected at least one object, the predetermined operation being based on control by a second input device and a comparison of the defined first region and another second region representing a position of the display as defined by the second input device while the at least one object is maintained selected.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
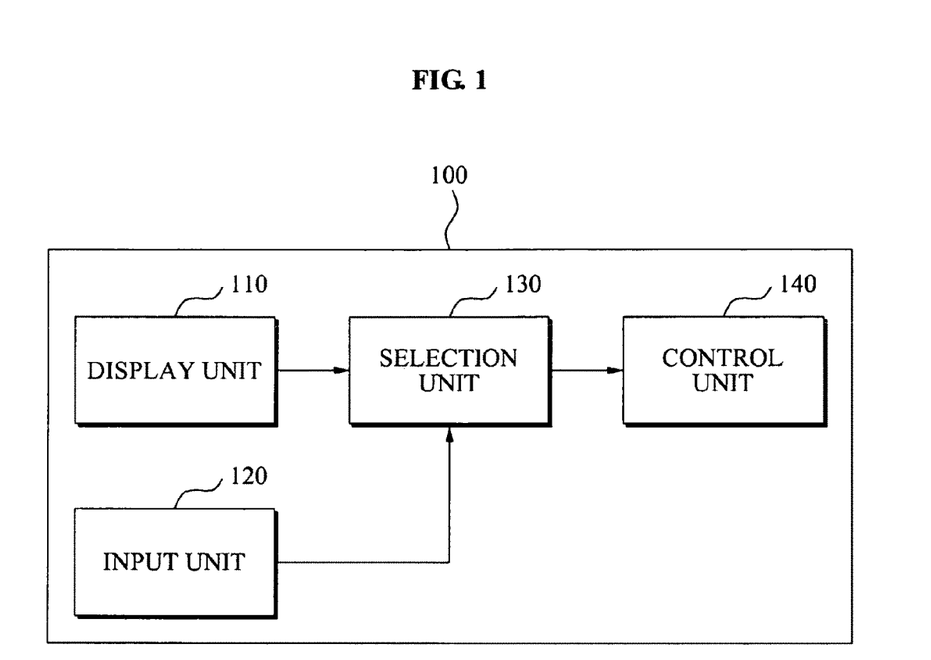
FIG. 1 illustrates a configuration of a display information controlling apparatus, according to one or more embodiments.

FIG. 1 illustrates a configuration of a display information controlling apparatus 100, according to one or more embodiments. Herein, throughout the following description, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing elements. As only another example, a respective apparatus/system or method could also be controlled through one or more processing elements/devices or implemented by a distributed network, noting that additional and alternative embodiments are equally available.

The display information controlling apparatus 100 may include a display unit 110, an input unit 120, a selection unit 130, and a control unit 140, for example. The display information controlling apparatus 100 may further include a database. Here, though the display unit 110 is illustrated as being constituted within the display information controlling apparatus, as noted above the display information controlling apparatus may be a system and the display unit 110 is not required to be within the same enclosure or location as the remaining elements. Likewise, as noted, all of the display unit 110, input unit 120, selection unit 130, and control unit 140 can be separately located. In addition, though only one display unit 110 or only one input unit 120 is shown, embodiments are not limited thereto.

Thus, here, the display unit 110 may further include a display that may display one or more objects with respective first regions. For example, the display unit 110 may display the one or more objects on a background portion or layer of the screen, for example.

The first region denotes a defined region on the display where an object exists. When the plural objects are spread across the display, respective first regions may also be scattered on the display. The object may be any selectable/deselectable digital objects that are shown on the display, for example. One such example is an icon, which is a small picture or symbol to be displayed on the display so that a user may intuitively recognize the particular file or folder, for example, represented by the icon. For brevity of explanation, embodiments will be explained through an embodiment where the objects are all icons, noting that embodiments are not limited thereto.

As only an example, the file icon may be a media file icon associated with a music file, a motion picture file, and the like, an image file icon associated with a picture, a photo, and the like, and a document file icon, noting that alternatives are equally available.

The input unit 120 may receive, from a user, an input signal corresponding to a positioning of a second region relative to the displayed icons, with the second region being a defined region representing the desired position of the input signal. For example, the second region denotes a region, which could be displayed on the display, corresponding to a position on the display that is pointed to, as defined by the input signal.

According to an embodiment, the input unit 120 may receive the input signal from the user via at least one of a touch panel of the display unit 110 and a mouse, for example, again noting that additional and/or alternative input devices are also available. Here, the touch pad could be a pad that overlays the display of the display unit 110, a touch recognizable area of the display of the display unit 110, or a pad positioned near the display of the display unit 110, though the relative placement of the touch pad and the display of the display unit 110 are not necessary.

As only an example, when the input signal is received from the user via the touch panel, the second region may correspond to the region on the touch panel or the display where a touch input signal is sensed. For example, the second region may correspond to an area or position of the display represented by a position or point on the touch panel. As another example, when the input signal is received from the user via the mouse, the second region may correspond to a region on the display where a mouse cursor is displayed.

According to another embodiment, as noted above, the input unit 120 may receive the input signal from the user via at least one of an infrared sensor, a camera, a capacitive sensor, and an electric field sensor in addition to the touch panel and the mouse, noting that these alternative inputs are only examples and alternative inputs, or a combination of the same, may equally be available.

An infrared sensor may be included with the display information controlling apparatus 100 and may receive the input signal of an infrared pointing device. In addition to the infrared sensor, the input signal of the pointing device may be detected using an infrared camera.

A camera may be used to detect the input signal of the pointing type based on visual codes, for example. The visual code may be a tag that has a predetermined shape. Since the camera stores the shape of the tag that constitutes the visual code, the camera may recognize from input light another tag that is in the same shape as the shape of the tag constituting the visual code, and sense a direction designated by the recognized tag, i.e., the camera could recognize the user moving a pointing device by recognizing the pointing device and detecting movement of the same.

The camera may be used to receive the input signal of the pointing device using a predetermined physical object. In this instance, the physical object may be recognized as a pointing input. If the camera, or other input recognizing device, is capable of detecting movement of a user's hands, for example, then the input signal could be detected merely by movement by the user without the need of such a pointing device. The camera could alternatively be capable of recognizing several different physical objects and an input signal could be discerned from movement, or non-movement, of the same. As only an example, if the display information controlling apparatus was an interactive tabletop computer, e.g., with users interacting with a display positioned below a table surface, a user could move a physical object on the tabletop and the a corresponding icon could be moved on the display, and the user could interact with the icon in a similar manner as described herein with the user controlling the interaction through movement of a hand or hands over the display, for example.

The capacitive sensor may be used to receive the input signal of the pointing device using a capacitive sensing, here the pointing device could merely be a user's finger or multiple fingers as multiple pointing devices for pointing and/or additional capabilities for the display information controlling apparatus 100. An electric field sensor may be used to receive the input signal of such a pointing device by sensing an electric field. When the input signal is received via the capacitive sensor or the electric field sensor, for example, it is thus possible to identify coordinates of the input signal on the display and a distance, e.g., a height, within the display in a vertical direction.

Accordingly, based on the input signal, the selection unit 130 may select at least one icon from the one or more icons based on respective first regions of the one or more icons and the second region for a pointer or cursor.

Figure 2A:
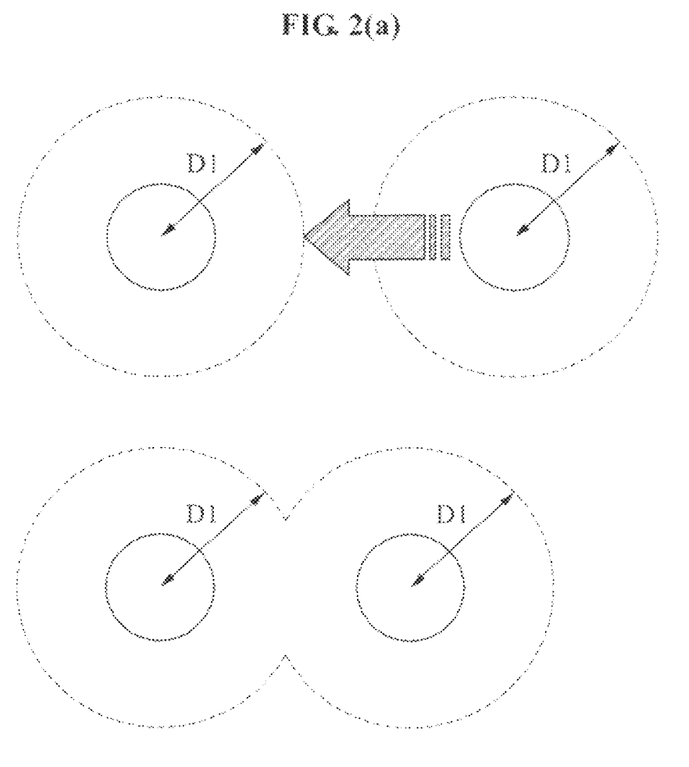
FIGS. 2(a) and 2(b) illustrate example first regions and second regions for a controlling of display information, according to one or more embodiments.
Figure 2B:
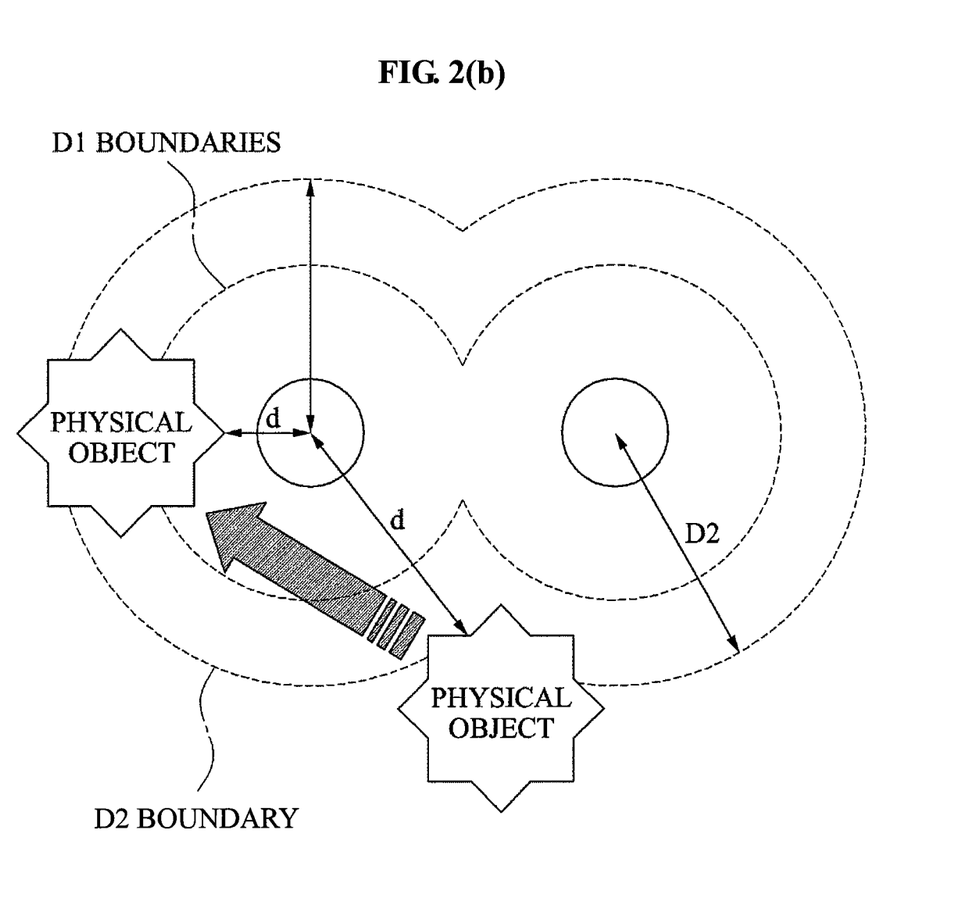

Here, to further understand the meaning of the termed first region, for example, it can be considered that there exist two different distances D1 and D2, as shown in FIGS. 2(*a*) and 2(*b*). Here, FIG. 2(*a*) illustrates example respective distances D1 displayed icons, an example radially equal area of the display extending from the center of the icon to the distance D1 for a single icon would represent a region for that icon. When two more icons become "grouped" together, e.g., after a determination that the respective regions of each icon overlap, for example, then the area surrounding both icons based on their respective D1 distances would then represent the region for the grouping of the two icons, e.g., a distance D1 defined region. Herein, an outer limit of each of these regions defined by the respective distance D1 from the center of each icon may be considered a boundary for that icon or groups of icons. For example, when these distance D1 boundaries of two icons overlap the two icons may be grouped, as shown. Then when the two icons are grouped the boundary for the group would be defined by the outer limit from either of the icons at the respective D1 distances. Here, though FIG. 2(*a*) illustrates the distances D1 for each icon as being identical, embodiments are not limited thereto, but for brevity of explanation it will be typically assumed herein that the distances D1 from each icon are the same. Accordingly, in an embodiment, this distance D1 boundary defined region for each icon may control whether two nearby icons are grouped, i.e., based on whether their distance D1 boundaries overlap.

The second distance D2 shown in FIG. 2(*b*) defines a further distance D2 boundary for each icon or grouping of icons for deciding if a user manipulated pointer or cursor, as represented by the illustrated "physical object" in FIG. 2(*b*), crosses or touches the boundary of the icon or grouping of icons for selecting the icon or grouping of icons. Thus, this distance D2 boundary for each icon may be considered to be an outer boundary of a region for the icon to control selection by the pointer of cursor, i.e., a threshold for defining selection of respective icons. Hereinafter, distance D2 boundary will be referred to as the first region. In addition, the user manipulated pointer or cursor may also be defined to have a boundary that defines a corresponding region for the pointer or cursor. Hereinafter, this region for the pointer or cursor will be referred to as the second region.

As will be discussed below, the illustrated distance D2 boundary for the icon or grouping of icons can be used for selecting or deselecting the icons, e.g., as the boundary of the second region of the pointer or cursor overlaps the boundary of the first region of the icon. In addition, as further discussed below, if the pointer or cursor is moved within the distance D2 boundary then the icon or grouping of icons could be selected, and then additional control such as changing volumes, controlling the amount information to show in the folder, etc., may additionally be defined by how close to the center, for example, of each icon or grouping of icons the pointer or cursor becomes. In addition, the referencing of a movement of a pointer or cursor on the display relative to the displayed icons or grouping of icons is not necessary, as a movement of the input device defined by the input signal can equally define where the user is pointing without a displaying of a pointer or cursor indicator relative to the displayed icons or grouping of icons. For example, an infrared pointing device could identify a desired positioning relative to the displayed icons or grouping of icons, and further control aspects of the icons or grouping of icons, without requiring a display of any corresponding pointer or cursor. In addition, though the above discussion makes reference to different distances D1 and D2, embodiments may not be limited to such distances being different. Further, for the same icon or grouping of icons, the relative differences between distances D1 and D2 are not required to always be the same in all directions, just as each distance D1 and D2 are not required to equal in all directions.

Still further, within a grouping of icons, the respective distances between the centers of each icon may further be used as an additional control for those icons. For example, when two grouped icons are sound files or sound generating operations, the grouped icons may be played together. The distance between the centers of each icon within the group and the pointer or cursor can still be a control mean for each icon as well. For example, if the icons represent sound sources of music, such as drum, piano, voice and so on, then user can group some of the sound sources together, such as the piano and the voice, by moving the respective icons close enough, e.g., such that their distance D1 boundaries meet or overlap. And then the user may move the pointer or cursor closer to the center of the grouped icons and play the piano and the voice together. The user may further control the volumes for each icon by changing the distance between the two. The user can still further increase the volume of piano sound while the volume of the voice is decreased. For example, FIG. 2(b) shows the pointer or cursor reaching the distance D2 boundary for the grouping of icons, formed by the combination of the respective distance D2 boundaries from the two centers of the two icons, and then the two icons can be selected. As the user moves the pointer or cursor along the illustrated arrow, the distance between the illustrated left icon and the pointer or cursor becomes shorter. Thus, a volume for a music file represented by the left icon can be controlled to increase with respect to this shortening distance. Similarly, the distance between the right icon and the pointer or cursor would increase, and the volume for the music file represented by the right icon could be controlled to decrease with respect to that increasing distance.

Likewise, within a grouping of icons a select icon can be separately controlled. For example, all icons within the group may be selected when the pointer or cursor is located within the distance D2 boundary of the grouping of icons. If the pointer or cursor is further moved to be within a distance D1 boundary for a select icon of the group, the other icons may be released from being selected, e.g., further movements of the pointer or cursor relative to the select icon may not affect the remaining icons of the group, their respective operations may change relative to their de-selection, or they may continue operation and the select icon may be individually controlled.

Accordingly, the selection unit 130 may select at least one icon from the one or more icons based on a location of each of the one or more icons and a location of a region on the display corresponding to the input signal. Herein, the region where the mouse cursor is shown will again be referred to as the second region, and the selection unit 130 may select the at least one icon based on a location of the mouse cursor and a location of a corresponding icon, e.g., based on a boundary of the second region and a boundary of the icon, such as aforementioned the distance D2 boundary.

In an embodiment, directional information for the example cursor, and the respective second region, can be obtained from a defined shape of the pointer or cursor, such as a pointing arrow. The second region could thus be defined by be the illustrated outside boundary of such a pointing arrow. Additional directional information for such a pointer or cursor may be controlled by a user or through other possible techniques, such as through an inertial measurement unit. With such directional information, and a set boundary for the second region, the distance D2 for an icon or grouping of icons, it may be further possible to control the operation of the icon or grouping of icons using directional control, similar to above individual icons within a grouping being controlled. When the boundary for the second region, i.e., for the pointer or cursor, reaches within the distance D2 boundary of the icon or grouping of icons, i.e., the boundary of the first region, then the icon or icons can be become selected, and for example, a user could further control the selected icon or grouping of icons by changing the directional orientation of the pointer or cursor, such as rotating the pointer or cursor.

In addition, as noted above, one or more embodiments may include plural pointer or cursor controlling devices, again noting that such pointers or cursors are not required to be displayed. With the above volume control example, a first pointing device could be moved within the distance D2 boundary of an icon or grouping of icons and then rotated to control the volume of selected music files represented by the icon or grouping of icons. A second pointing device may then be used to either control other icons or another grouping of icons, or the same icon or grouping of icons already controlled by the first pointing device, e.g., to control a different feature of the icon or grouping of icons. If a keyboard is cooperating with such a pointing device, then once the icon or grouping of icons is selected a user could further control the operations of the icon or grouping of icons through the keyboard. Here, the keyboard could also act as a pointing device, e.g., through cursor movements of the arrow keys on the keyboard, or through a track pad of the keyboard.

Still further, the relative movements of the pointer or cursor with regard to time can also be used to control the operations of the icon or grouping of icons. For example, if pointer or cursor stays within the distance D2 boundary for a threshold period of time, then the display can be controlled to stop showing only a limited amount of information regarding the icon or grouping of icons, and additional information regarding the icon or grouping of icons may then be displayed, such as in a display full screen mode or in a correspondingly opened window with the additional information. In one embodiment, e.g., for the case of MP3 files, if the pointer or cursor stays within the distance D2 boundary for a grouping of MP3 file representing icons for a predetermined period of time, then the volume for a closest icon of the grouping of icons may be increased and the volumes of the other icons of the grouping of icons may be gradually decreased and then finally stop playing. Additional controls for individual or a grouping of icons, or individual icons within such a grouping, may equally be available using such time based movements. Likewise, if the time duration for which a pointer or cursor falls within or touches the distance D2 boundary of an icon or grouping of icons does not meet a threshold, then potentially the icon or grouping of icons may not be selected and movement of the pointer or cursor relative to the icon or grouping of icons may be considered inadvertent or insufficient to change the status of the icon or grouping of icons.

Thus, as noted above, the selection unit 130 may select the at least one icon based on a location of the first region and a location of the second region.

Accordingly, as it is possible to determine locations of each of one or more icons, or boundaries of each of the one or more icons, and the location of a pointer or cursor on the display corresponding to the input signal, e.g., the boundary of the second region of the pointer or cursor, the at least one icon can be selected based on the determined locations.

In this instance, the selection unit 130 may select the at least one icon having a boundary that is overlapping a boundary of the second region, i.e., the boundary of the pointer or cursor.

When the distance is close between a location of a corresponding icon and the location of the second region on the display corresponding to the input signal, for example, a location of the mouse cursor, it may be interpreted that the user has a greater interests in the corresponding icon(s) compared to other icons. Thus, when the distance between the first region and the second region is less than a predetermined threshold value, or overlapping, the selection unit 130 may select an icon that exists in the first region. In an embodiment, the selection of an icon may then be used to move the icon across the display, e.g., to be grouped with another icon, if desired, or other controls can thereafter be implemented with respect to the icon.

As only an example, the distance between the first region and the second region, or relative locations, may be calculated based on a centroid of each of the first region and the second region. In this case, the distance between the first region and the second region may be a distance between the centroid of the first region and the centroid of the second region.

In addition, the distance between the first region and the second region may be calculated based on the boundary of each of the first region and the second region. In this case, the distance between the first region and the second region may be the minimum distance between the boundaries of the first and second regions, or an average of distances, for example. The threshold cold be considered a setting of the aforementioned distance D2 boundary for an icon, thus the threshold cold define the extent of the first region.

In an embodiment, the threshold value may be set based on at least one of a size of the display and a number of icons that are displayed on the display. The threshold value may further be arbitrarily set by the user, or a weighting for such a threshold calculation can be set by a user, noting that alternative embodiments are equally available.

Hereinafter, an operation of the selection unit 130 to select at least one first icon from one or more icons will be described in detail with reference to FIG. 3.

Figure 3:
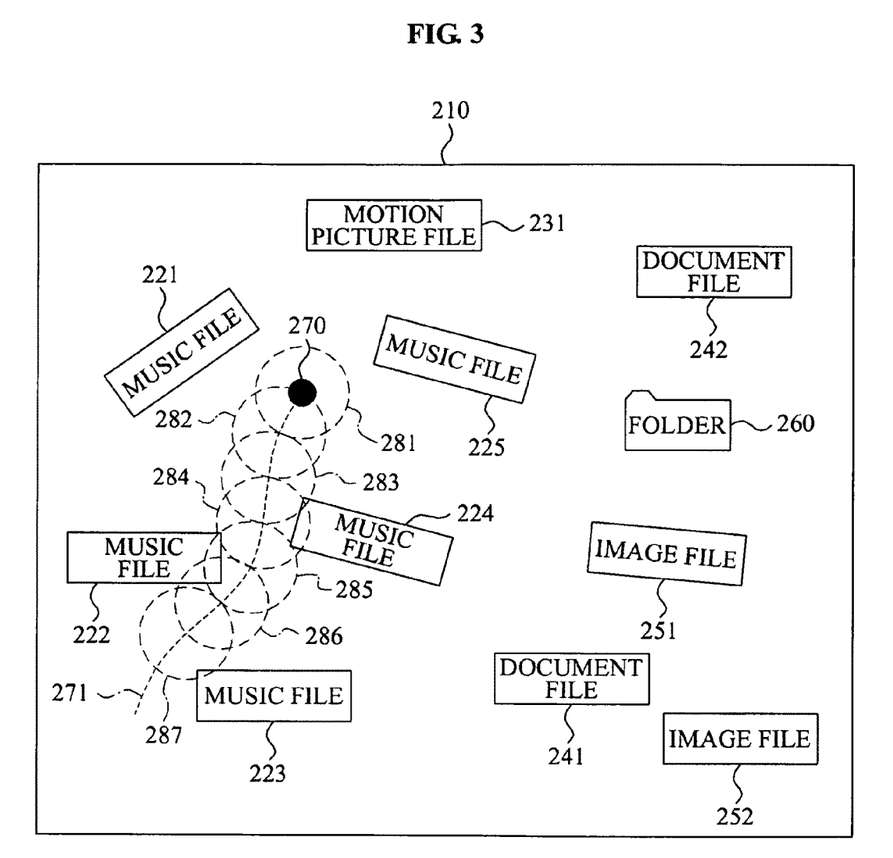
FIG. 3 illustrates a display of a terminal showing a controlling of display information, according to one or more embodiments.

FIG. 3 illustrates a display 210 of a terminal showing the controlling of display information, according to one or more embodiments.

Here, for brevity, it will be assumed that the display information controlling apparatus receives an input signal from a user via a touch panel that is provided with relation to the lower portion of the display 210. The display 210 may alternatively be a touch display, though embodiments are not limited thereto.

Multiple icons are randomly displayed on display 210 shown in FIG. 3, the icons include music file icons 221, 222, 223, 224, and 225, a motion picture file icon 231, document file icons 241 and 242, image file icons 251 and 252, and a folder icon 260.

FIG. 2 illustrates a region on the display corresponding to touch input signal 270 and a corresponding travel path 271 of the touch input signal 270.

Each of a first location 281, a second location 282, a third location 283, a fourth location 284, a fifth location 285, a sixth location 286, and a seventh location 287 denotes the boundaries of a second region (hereinafter, a threshold region) of a circle that may use, as its origin, a location where the touch input signal 270 is sensed, and may use a predetermined threshold value as its radius. In FIG. 3, the threshold region is expressed to discretely move for convenience of description, but the threshold region may continuously move.

As the touch input signal 270 moves along the travel path 271, when the threshold region reaches the third location 283, the music file icon 224, i.e., a boundary of the file icon 224, may overlap the threshold region. Accordingly, the selection unit 130 may cause the music file icon 224 to become selected.

As the touch input signal 270 continuously moves along the travel path 271, when the threshold region reaches the fourth location 284, the music file icon 222 may overlap the threshold region. In this instance, since both the music file icons 222 and 224 simultaneously overlap the threshold region, the selection unit 130 may maintain the selection of music file icon 224 and additionally select the music file icons 222.

When the threshold region reaches the sixth location 286, only the music file icon 222 may overlap the threshold region. Accordingly, the selection unit 130 may only maintain the selection of the music file icon 222.

When the threshold region reaches the seventh location 287, the music file icon 222 may no longer overlap the threshold region, but another music file icon 223 may then overlap the threshold region. Accordingly, although the selection unit 130 may not maintain the selection of music file 222, the music file icon 223 may be selected.

The control unit 140, shown in FIG. 1, of the display information controlling apparatus 100 may control a predetermined operation of the selected at least one icon, for example. In an embodiment, the aforementioned controlling of the operation of icons or groupings of icons can thus be implemented by the control unit 140, for example.

Again, the predetermined operation controlled by the control unit 140 may denote a processing operation of a file or a folder that is associated with the selected at least one icon. As noted above, the selection of an icon may permit a user to thereafter move the icon or perform additional operations, such as the below. In addition, as noted above, in one or more embodiments, such a selection of an icon could be based upon the overlapping of the boundary of the icon and the boundary of the pointer or cursor existing for a minimal period of time before confirming the actual selection of the icon.

For example, according to an embodiment, when the selected at least one icon includes an icon associated with a media file, the control unit 140 may control the media file to be played.

Specifically, when the selected at least one icon is a media file icon, the control unit 140 may control a media file associated with the selected at least one icon to be played. In this case, the media file may be a music file or an audio file (hereinafter, referred to as a music file) such as MP3 and may also be a motion picture file or a video file (hereinafter, referred to as a motion picture file), noting that additional and/or alternative media file types are also available.

When the media file is a music file, the control unit 140 may control the music file to be played so that the user may listen to music.

When the media file is the motion picture file, the control unit 140 may control a preview of a corresponding motion picture to be played via a play window so that the user may view the preview of the motion picture, for example. The play window may be generated around the motion picture icon, for example. In addition, as noted above, in one or more embodiments, there may be more than one display available, and such a selection of a motion picture file could selectively be played on a different display.

When a plurality of icons are selected, the control unit 140 may control all the media files associated with the media files to be played. As noted above, plural icons could be selected if the corresponding boundaries for those icons overlap, e.g., the aforementioned distance D1 boundary. In addition, if plural input devices are used then plural icons that are not grouped through such overlapping boundaries could still be controlled collectively or individually.

As an example, as shown in FIG. 3, when the threshold region exists in the fourth location 284 and the fifth location 285, the music files icons 222 and 224 may both be under selection. In this case, the control unit 140 may control all the music files associated with the music file icons 222 and 224 to be played.

According to an embodiment, the control unit 140 may control the media file to be played from a beginning of the media file, or at a later controllable start position.

According to another embodiment, the control unit 140 may permit a user to control selection of a highlight region of available portions of the media file and further control selective playing of the highlight portion of the media file.

In the case where the control unit 140 controls the playing of the highlight portion of the media file, the user may relatively quickly recognize a content of the media file in comparison to a case where the control unit 140 controls the media file to be played from the start or in whole. In addition, such a minimized playback could be an automated operation upon selection of the media file.

In one or more embodiments, for example, the highlight portion may be set by the control unit 140 and may also be arbitrarily set by a media file producer.

According to an embodiment, and as noted above, the control unit 140 may further adjust the volume of the media file based on the location of the second region, e.g., the boundary of the pointer or cursor, relative to the first region of the media file, e.g., based upon how close the second region is to the center of the first region of the media file.

In such an embodiment, as the distance between the first region and the second region becomes closer, e.g., as the second region progresses through the region for the media file between the aforementioned distance D2 boundary, toward the distance D1 boundary, and then potentially progressing past the D1 boundary toward the center of the of the first region, it may be interpreted that the user has more interest in the media file associated with the particular icon that exists in the first region compared to other icons, including other icons that may be included in the first region when plural icons are grouped. Therefore, according to an embodiment, the control unit 140 may adjust the volume of the media file in inverse proportion to the distance between the first region and the second region, to thereby control the medial to be played.

For example, as the first region and the second region further overlap and the pointer or cursor progresses toward the center of the first region, the control unit 140 may increase the volume of the media file being played. Here, the increase in volume could be linear directly based upon the linear progression of the pointer or cursor, but embodiments are not limited thereto. Conversely, as the overlap between the first region and the second region lessons, the control unit 140 may decrease the volume of the media file being played. This may correspond to a fade-in/fade-out function that is used to play the music file, for example. In addition, for example, if the volume control is linear based, then if the travel path of the pointer or cursor was not toward the center of the first region, e.g., inward but at an angle, the linear changing in volume would be different from the linear progression of the pointer or cursor, though still registerable as desiring an increase in volume.

In addition, as noted above, according to another embodiment, the control unit 140 may adjust the volume of the media file being played by further considering a location relationship between the regions of the media files, e.g., the aforementioned boundary D1 defining regions.

In a case where the selection unit 130 selects two music file icons, the control unit 140 may simultaneously play the two corresponding music files associated with the selected two music file icons. However, when the selected two music files icons are grouped, as noted above, the two music files may both be played at the same, and potentially with a loud volume, which is typically undesired by the user.

Thus, as noted, in this case, the control unit 140 may adjust the volume of the music file being played by further considering a distance between the two music file icons. Here, the volumes of the two music files may be controlled by a function of the relative relationship of the distances between the pointer and each of the two music files. For example, the volumes of the two music files can be adjusted by multiplying the ratio of the two distances which are the distances between the pointer and the each of the two music files.

For another embodiment for the adjustment, a user also could control the movement of one or both of the music file icons. For example, the corresponding pointer or cursor could be controlled by a mouse with plural buttons, such that movement of the selected icons could be implemented by depressing one of the buttons while moving the mouse, thereby moving the selected icon. Here, movement could be limited to a closest of the grouped icons, or if positioned equal distanced between icons both icons could be moved.

Accordingly, the control unit 140 may increase the volume of a music file whose icon is closest to the second region and/or may decrease the volume of the music file whose icon is farther from the second region. If there are more than two icons, then potentially the remainder of icons other than the closest may be collectively controlled, though embodiments are not limited thereto.

According to an embodiment, when the media file is a motion picture file, the control unit 140 may also selectively adjust the size of the play window in addition to adjusting of the volume.

Specifically, as the first region and the second region further overlap and the pointer or cursor progresses toward the center of the first region, the control unit 140 may increase the volume of the motion picture file being played and the size of the play window. Conversely, as the overlap between the first region and the second region lessens, the control unit 140 may decrease the volume of the motion picture file and the size of the play window. Here, it is noted that grouped icons are not required to all be of the same type. For example, such a motion picture icon could be grouped with one or more music file icons. In another embodiment, plural motion picture icons could be grouped, in which case a potentially predefined controlled interaction may be implemented, e.g., the movement of the pointer or cursor between icons or toward or away from one of the icons could control an opacity of one of the corresponding motion pictures if they are overlaid each other on a display. Additional embodiments are equally available.

According to an embodiment, an as noted above, the input unit 120 may further receive a second input signal corresponding to the first region of an icon.

Specifically, when the input unit 120 receives an additional input signal, that is, a secondary input signal and a corresponding secondary second region of the display corresponding to the secondary input signal is overlapped with a first region of an icon, the control unit 140 may control file information of a media file associated with the icon existing in the first region to be displayed on the display. In this case, the media file may be continuously in a play state upon selection, for example. The file information could further be additional information regarding the icon, which could be displayed on the display in a full screen mode or in another window, for example.

Hereinafter, FIG. 4 will be referred to for the case where a selected icon is associated with a media file and the input unit 120 receives two input signals. Accordingly, an operation of the control unit 140 will now be further described with reference to FIG. 4.

Figure 4:
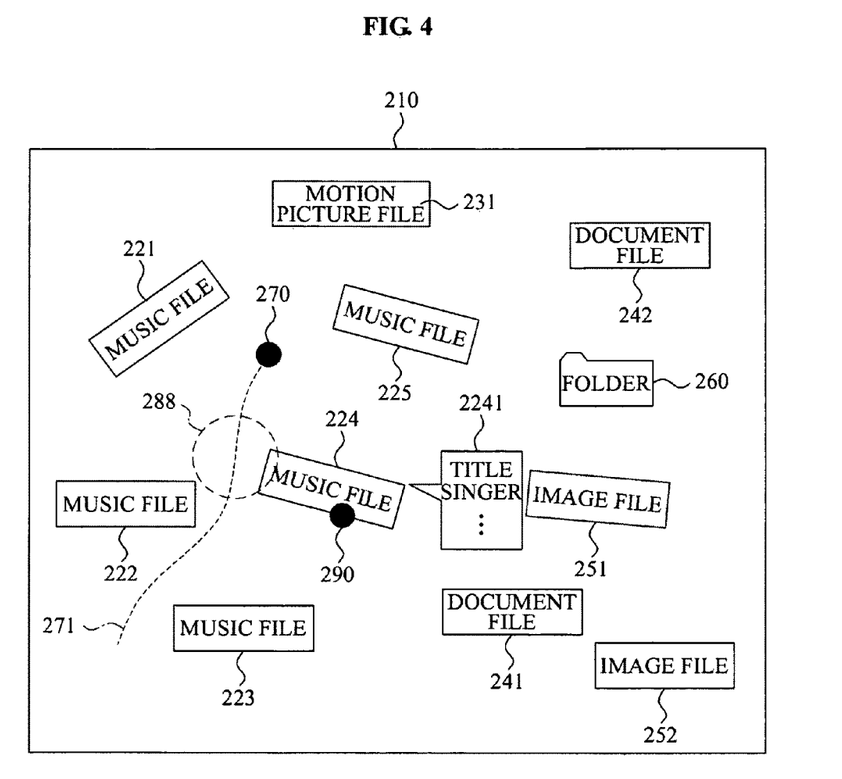
FIG. 4 illustrates a display of a terminal showing a controlling of display information, according another one or more embodiments.

FIG. 4 illustrates a display 210 of a terminal showing a controlling of display information, according to another one or more embodiments.

According to an embodiment, two input signals, for example a first input signal 270 and a second input signal 290, may be received from a user, e.g., via different input units or different controls of the same input device, respectively.

According to another embodiment, the first input signal 270 and the second input signal 290 may be received via a touch panel. In this case, the display 210 of the terminal that is controlled by the display information controlling apparatus may be a touch display. The touch display may distinguish two input signals from each other and thereby receive the input signals.

For example, the touch display may recognize, as separate input signals, the first input signal 270 that is input via a hand of the user and the second input signal 290 that is input via a physical object excluding the hand of the user.

Hereinafter, for brevity, it will be assumed that the two input signals are received via the touch display, though embodiments are not limited thereto. Specifically, in this example, the two input signals may be touch input signals.

As shown in FIG. 4, when a threshold region exists in an eight location 288, the selection unit 130 may select a music file icon 224 and the control unit 140 may control a music file associated with the music file icon 224 to be played.

In this instance, when a second touch input signal is detected in a first region for music file icon 224, the control unit 140 may further control file information 2241 associated with the music file of the music file icon 224 to be displayed on the display 210. As shown in FIG. 4, the file information 2241 may be displayed near the music file icon 224, though the file information may be displayed at an alternative location. As only an example, the file information 2241 may include a title, a singer, a composer, and the like, of a song that are stored in the corresponding music file.

In an embodiment, when the user desires to become aware of information associated with the music file while listening to music, the user may further select the music file to verify the information. Accordingly, the user may retrieve a music file that the user desires to play, using both a visual sense and an auditory sense, to thereby more quickly retrieve the music file.

According to an embodiment, when the selected at least one icon includes an icon associated with a document file, the control unit 140 may control at least one of a content of the document file and the file information associated therewith to be displayed on the display, for example.

In this case, the control unit 140 may adjust at least one of an amount of the content of the document file and an amount of the file information associated therewith, e.g., based on the overlap of the first region and the second region, to thereby be displayed on the display.

For example, as the first region and the second region become more overlapped, the control unit 140 may increase the amount of the content of the document file being played. Conversely, as the first region and the second region become less overlapped, the control unit 140 may decrease the amount of the content of the document file.

The file information of the document file displayed on the display may include at least one of a title, an abstract, and a keyword, for example.

According to an embodiment, when the selected at least one icon includes an icon associated with an image file, the control unit 140 may control a preview image of the image file to be displayed on the display. For example, the preview image may be generated to overlay or be shown near the image file icon. As only an example, the size of the image could also be controlled based upon the positioning of the pointer or cursor relative to the region of the icon(s), noting that alternative and/or other embodiments are equally available.

Also, according to an embodiment, when the selected at least one icon includes an icon associated with a folder that stores a plurality of image files, for example, the control unit 140 may control a preview image of at least one image file among the plurality of image files to be displayed on the display. Here, the sizes of the images and/or number of images shown could be controlled based upon the positioning of the pointer or cursor relative to the region of the icon(s), noting that alternative and/or other embodiments are equally available.

For example, the control unit 140 may adjust a number of preview images to be displayed on the display, based on a location of the first region and a location of the second region.

Hereinafter, an operation of the control unit 140 to display, on a display, preview images of image files stored in a folder will be described in greater detail with reference to FIG. 5.

Figure 5:
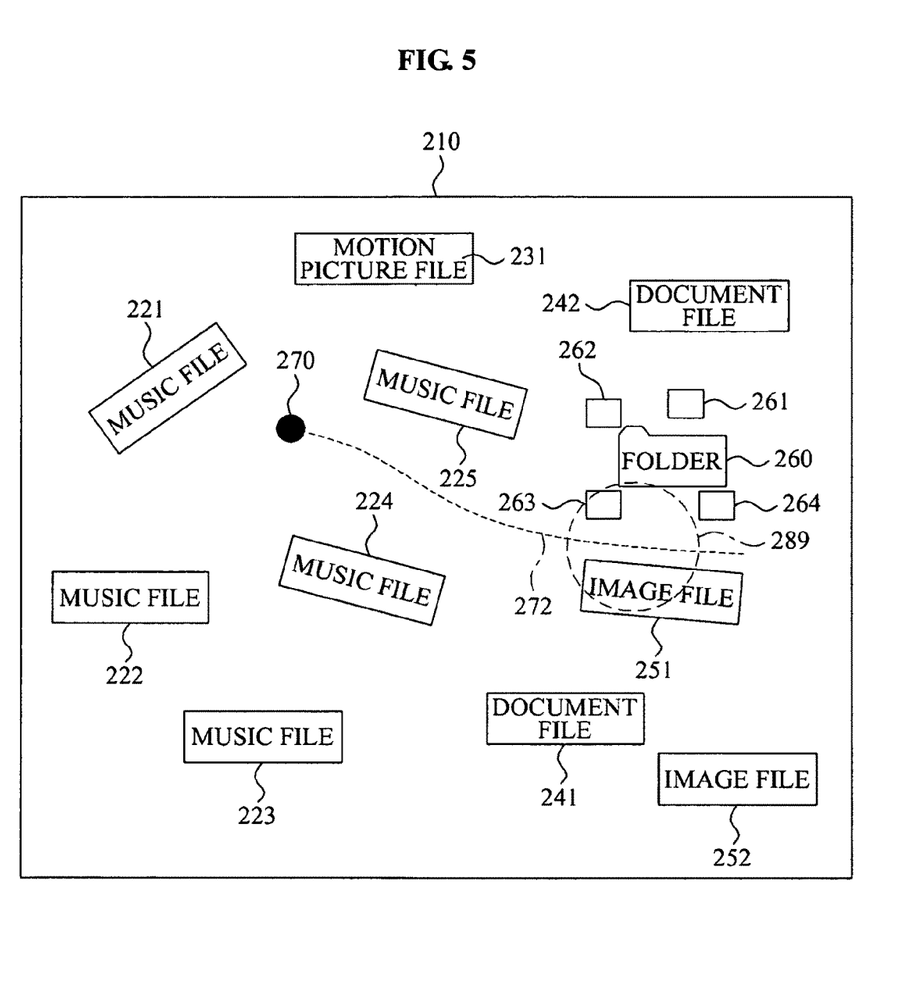
FIG. 5 illustrates a display of a terminal showing a controlling of a display information, according to still another one or more embodiments.

FIG. 5 illustrates a display 210 of a terminal showing a controlling of display information, according to still another one or more embodiments.

Here, for brevity, it will be assumed that an input signal is a touch input signal 270 received via a touch display including a touch panel, though embodiments are not limited thereto.

The region for the touch input signal 270 may move along a travel path 272. When a threshold region is located in a ninth location 289, the threshold region may at least overlap the first region for folder icon 260. Here, it is noted that the threshold region also overlaps image file icon 251.

In this embodiment, the control unit 140 may control a preview image of at least one image file among a plurality of image files that are included in a folder associated with the folder icon 260 to be displayed on the display 210. In FIG. 5, four example preview images 261, 262, 263, and 264 are displayed around the folder icon 260.

The control unit 140 may adjust the number of preview images to be displayed based on a distance between a location of the touch input signal 270 and a location of the folder icon 260. For example, as the touch input signal 270 becomes more overlapped with the first region for the folder icon 260, the control unit 140 may increase the number of preview images to be displayed. Conversely, as the touch input signal 270 moves becomes less overlapped the folder icon 260, the control unit 140 may decrease the number of preview images to be displayed.

As described above, the display information controlling apparatus 100 may further include a database. The database may store information about the at least one of the one or more first regions and second regions. In an embodiment, the stored first and second region information, potentially including location information for the first and/or second regions, may be updated every time locations of a plurality of icons and a location of a region on a display corresponding to an input signal are changed.

In addition, the database may further store a list of the selected at least one icons.

When a second region for a pointer or cursor moves across the display, the database may store a list of icons that are sequentially overlapped, and potentially selected, by the corresponding second region of the pointer or cursor.

For example, as described above with reference to FIG. 3, when the second region for the first input signal 270 moves along the travel path 271, the music file icons 224, 222, and 223 may be sequentially selected. In this case, the database may generate and store a list of the selected music file icons 224, 222, and 223.

In an embodiment, the control unit 140 may control at least one music file to be sequentially played according to the stored list. For example, if a required overlap period is met or not required, then merely the movement of the pointer or cursor across the display could select plural icons as the first region of each icon is overlapped by the second region of the pointer or cursor, and selection of those icons could be maintained even after the overlapping has passed. The plural selected icons could then be collectively controlled or sequentially controlled, for example.

Figure 6:
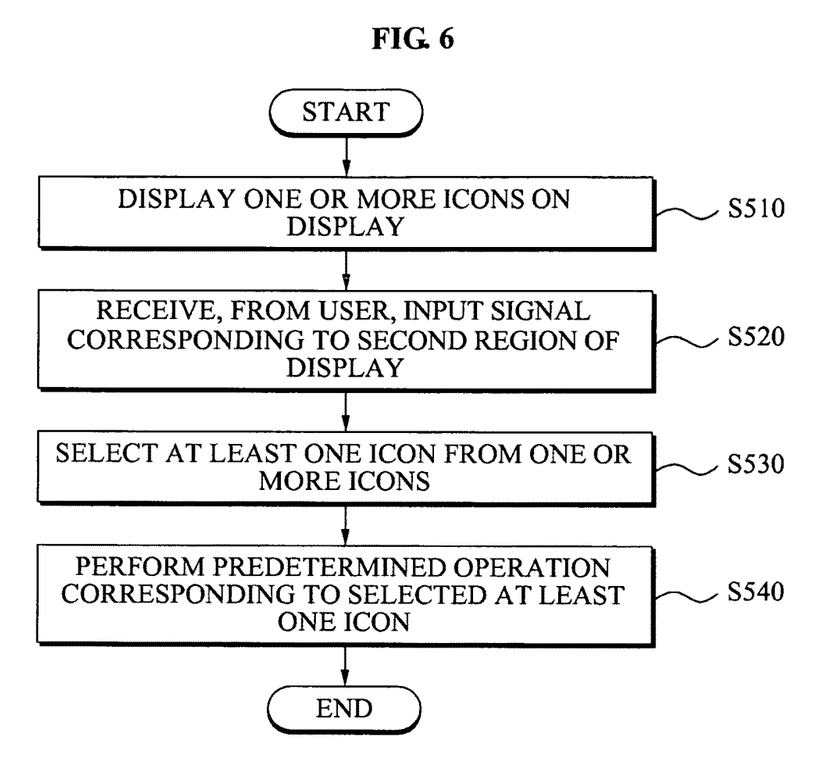
FIG. 6 illustrates a method of controlling display information, according to one or more embodiments.

FIG. 6 illustrates a method of controlling display information, according to one or more embodiments.

In operation S510, the display information controlling method may display one or more icons on a display, with each icon having a respective first region.

According to an embodiment, the one or more icons may be associated with at least one of a file and a folder, for example. Specifically, in an embodiment, the one or more icons may include at least one of a file icon and a folder icon.

In operation S520, an input signal corresponding to a second region for a pointer or cursor, for example, of the display may be received from a user.

According to an embodiment, in operation S520, the input signal may be received from the user via at least one of a touch panel, a mouse, an infrared sensor, a camera, a capacitive sensor, and an electric field sensor, for example.

In operation, S530, at least one icon may be selected from the one or more icons based on the first region of the at least one icon and the second region for the pointer or cursor.

According to an embodiment, in operation S530, the at least one icon may be selected based on the respective locations of the first region of the at least one icon and the location of the second region for the pointer or cursor, and the at least one icon may be selected based on an overlapping of the first region and the second region.

In an embodiment, the at least one icon provided within a predetermined distance from the second region, e.g., with the second region overlapping the first region of the at least one icon, may be selected, in operation S530.

In operation S540, a predetermined operation corresponding to the selected at least one icon may then be controlled to be performed.

According to an embodiment, when the selected at least one icon includes an icon associated with a media file, the media file may be played in operation S540. For example, when the selected icon is a media file icon, the media file associated with the selected media file icon may be played. When a plurality of icons are selected in operation S530, all the media files associated with the selected icons may be played in operation S540.

According to another embodiment, a select or highlight portion of the media file may be played in operation S540.

According to still another embodiment, in operation S540, the volume of the media file may be adjusted based on the relative locations of the first region and the second region. Specifically, as the overlap between the first region and the second region increases, the volume of the media file being played may be increased. Conversely, as the overlap between the first region and the second region lessens, the volume of the media file being played may be decreased.

According to yet another embodiment, in operation S540, the volume of the media file being played may be adjusted by further considering a location relationship between respective regions of the media files.

According to a further another embodiment, when the media file is a motion picture file, a size of a play window may be adjusted in addition to adjusting the volume.

According to still another embodiment, when a second input signal is further received in operation S520, relative to the first region, file information of the media file may be displayed on the display in operation 540. In this case, for example, the media file may be continuously in a play state upon selection.

According to still another embodiment, when the selected at least one file includes an icon associated with a document file, at least one of a content of the document file and file information associated therewith may be displayed in operation S540.

In this case, the display of at least one of an amount of the content of the document file and an amount of the file information associated therewith may be adjusted, based on a location of the first region and a location of the second region in operation S540.

According to still another embodiment, when the selected at least one icon includes an icon associated with an image file, a preview image of the image file may be displayed on the display in operation S540.

According to still another embodiment, when the selected at least one icon includes an icon associated with a folder that stores a plurality of image files, a preview image of at least one image file among the plurality of image files may be displayed on the display in operation S540.

In this case, the number of preview images to be displayed on the display may be adjusted based on a location of the first region and a location of the second region in operation S540.

Embodiments of such a display information controlling method may further perform operations corresponding to the aforementioned operations of the display information controlling apparatus of FIG. 1, though not limited thereto. Accordingly, further detailed descriptions related thereto will be omitted here.

In addition to the above described embodiments, embodiments can also be implemented through computer readable code/instructions in/on a medium, e.g., a computer readable medium, to control at least one processing device to implement any above described embodiment. The medium can correspond to any defined, measurable, and tangible structure permitting the storing and/or transmission of the computer readable code.

The computer readable code can be recorded included in/on a medium, such as a computer-readable media, and the computer readable code may include program instructions to implement various operations embodied by a processing device, such a processor or computer, for example. The media may also include, e.g., in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus for controlling display information, the apparatus comprising:
   a display unit to display at least one object on a display;
   a first region comprising the at least one object;
   a second region comprising a position on the display as defined by an input device;
   a selection unit to select the at least one object based on a first comparison of a position of the first region and the position of the second region; and
   a control unit to institute a predetermined operation with information represented by the selected at least one object based on a second comparison of the position of the first region and movement of the position of the second region with respect to the position of the first region, while the selection of the at least one object is maintained;
   wherein the instituting of the predetermined operation is based upon plural position measurements between a center of the first region and a boundary of the second region while the second region overlaps the first region.

2. The apparatus of claim 1, wherein the information represented by the at least one object is respectively at least one of a file and a folder.

3. The apparatus of claim 1, wherein the selection unit selects the at least one object at least when respective boundaries defining the first region and the second region meet.

4. The apparatus of claim 1, wherein the selection unit selects the at least one object when the second region intersects a boundary of the first region, the boundary being defined as at least one predetermined distance from the center of the first region, the first region including the displayed at least one object.

5. The apparatus of claim 4, wherein all predetermined distances are equal distanced in all directions from the center of the first region.

6. The apparatus of claim 4, wherein the boundary of the first region is a first boundary, and the selecting of the at least one object includes determining extents of the first region based on a determination of whether a second boundary, within the first boundary, of the first region intersects with another second boundary of another first region of another object, with the extents of the first region being defined by a combination of the first boundary of the at least one object and a first boundary of the other object based on a result of the determination.

7. The apparatus of claim 6, wherein the instituting of the predetermined operation is further based upon plural position measurements of a boundary of the second region, while the second region overlaps the first region, with respect to the respective second boundaries of the first regions of the at least one object and the other object.

8. The apparatus of claim 6, wherein the instituting of the predetermined operation is further based on a measured amount of time an overlapping of the first region and the second region is maintained, such that the predetermined operation differently controls interaction with objects within the first region based on the measured amount of time.

9. The apparatus of claim 8, wherein the different controlled interactions include controlling an object within the first region closest to the second region differently from remaining objects within the first region, such that control of the remaining objects is ceased after another measured amount of time and only control of the closest object is maintained.

10. The apparatus of claim 9, wherein the controlled interaction includes playing audio corresponding to each object within the first region, such that after the measured amount of time volumes of audio corresponding to the remaining objects are controlled to decrease, and after the other measured amount of time only the audio of the closest object is played.

11. The apparatus of claim 6, wherein the instituting of the predetermined operation is further based on a detected direction orientation of the input device, such that the predetermined operation differently controls interaction with objects within the first region based on the detected orientation.

12. The apparatus of claim 11, wherein the controlled interaction includes playing audio corresponding to each object within the first region based on the detected orientation, such that a volume for audio corresponding to at least one object within the first region is controlled based upon a changing of the direction orientation of the input device.

13. The apparatus of claim 6, wherein the selection unit collectively selects the at least one object and the other object when the determination of the extents of the first region indicates that the first object and the other object are within a threshold distance of each other, and singularly selects only one of the first object and the other object based on a comparison of a defined first region of only one of the first regions of the at least one object and the other object and the second region when the determination indicates that the first object and the second object are not within the threshold distance of each other.

14. The apparatus of claim 1, wherein the instituting of the predetermined operation is further based on a detected direction orientation of the input device.

15. The apparatus of claim 14, wherein the controlled interaction includes playing audio corresponding to the at least one object based on the detected orientation, such that a volume for audio corresponding to the at least one object is controlled based upon a changing of the direction orientation of the input device.

16. The apparatus of claim 1, wherein, when the selected at least one object is an object associated with a media file, the control unit controls the media file to be played upon the at least one object being selected.

17. The apparatus of claim 16, wherein the control unit controls only a portion of the media file to be played.

18. The apparatus of claim 17, wherein the portion of the media file is a predetermined portion of the media file determined before selection of the at least one object.

19. The apparatus of claim 16, wherein the control unit adjusts a volume of the media file based on the second comparison of the defined first region and the second region.

20. The apparatus of claim 16, further comprising an input unit
to receive a first input signal from the input device and a signal from another device, and
the control unit controls display of file information associated with the media file based on a determined relationship between another second region corresponding to the second input signal and the first region, while the at least one object is maintained selected.

21. The apparatus of claim 1, wherein, when the selected at least one object includes an object associated with a document file, the control unit controls display of at least one of a content of the document file and file information associated with the document file based on the second comparison of the defined first region and the second region.

22. The apparatus of claim 21, wherein the control unit controls the display of the content and file information to be adjusted to display at least one of an amount of the content of the document file and an amount of the file information associated with the document file based on the second comparison of the defined first region and the second region.

23. The apparatus of claim 21, wherein the file information comprises at least one of a title, an abstract, and a keyword and the adjusting of the display includes adjusting the display to selectively display the title, abstract, and keyword of the file information.

24. The apparatus of claim 1, wherein the control unit controls selection of the at least one object to occur only after a predetermined period of time lapses after the first comparison of the defined first region and the second region determines that the object should be selected.

25. The apparatus of claim 1, wherein the control unit is controlled to institute the predetermined operation with information represented by the selected at least one object based on the defined first region and the second region overlapping and a measured amount of time the overlapping of the first region and the second region is maintained.

26. The apparatus of claim 1, wherein, when the selected at least one object includes an object associated with an image file, the control unit controls a preview image of the image file to be displayed on the display upon the at least one object being selected.

27. The apparatus of claim 1, wherein, when the selected at least one object includes an object associated with a folder that stores a plurality of image files, the control unit controls a preview image of at least one image file among the plurality of image files to be displayed on the display based on the second comparison of the defined first region and the second region.

28. The apparatus of claim 27, wherein the control unit adjusts a number of preview images to be displayed on the display based on the second comparison of the defined first region and the second region.

29. The apparatus of claim 1, wherein the input device is a first device of at least one of a touch panel, a mouse, an infrared sensor, a camera, a capacitive sensor, and an electric field sensor.

30. The apparatus of claim 29, wherein a second input device, controlling an instituting of an operation for the at least one object based on a second region corresponding to the second input device being determined to overlap the first region, is a different device from the first device.

31. The apparatus of claim 1, further comprising:
a database storing position information of at least one of the first region and the second region.

32. The apparatus of claim 31, wherein the database further stores a list of currently selected objects, and the controlling of the predetermined operation for the at least one object further comprises instituting operations for at least one of the currently selected objects based on the stored list.

33. The apparatus of claim 32, wherein the list of currently selected objects includes a listing of objects whose respective first regions, defining respective position areas for each object, do not overlap.

34. The apparatus of claim 4, wherein the predetermined operation includes dynamically changing control of the information represented by the selected at least one object based upon the plural position measurement representing relative changing of the position of the second region while the second region overlaps the first region.

35. A method of controlling display information, the method comprising:
displaying at least one object on a display;
defining a first region comprising the at least one object;
defining a second region comprising a position on the display as defined by an input device;
selecting, by a processor, the at least one object based on a first comparison of a position of the first region and the position of the second region; and
instituting a predetermined operation with information represented by the selected at least one object based on a second comparison of the position of the first region and movement of the position of the second region with respect to the position of the first region, while the selection of the at least one object is maintained;
wherein the instituting of the predetermined operation is based upon plural position measurements between a center of the first region and a boundary of the second region while the second region overlaps the first region.

36. The method of claim 35, wherein the information represented by the at least one object is respectively at least one of a file and a folder.

37. The method of claim 35, wherein the selecting comprises selecting the at least one object at least when respective boundaries defining the first region and the second region meet.

38. The method of claim 35, wherein the selecting comprises selecting the at least one object when the second region intersects a boundary of the first region, the boundary being defined as at least one predetermined distance from the center of the first region, the first region including the displayed at least one object.

39. The method of claim 38, wherein all predetermined distances are equal distanced in all directions from the center of the first region.

40. The method of claim 38, wherein the boundary of the first region is a first boundary, and the selecting of the at least one object includes determining extents of the first region based on a determination of whether a second boundary, within the first boundary, of the first region intersects with another second boundary of another first region of another object, with the extents of the first region being defined by a combination of the first boundary of the at least one object and a first boundary of the other object based on a result of the determination.

41. The method of claim 40, wherein the instituting of the predetermined operation is further based upon plural position measurements of a boundary of the second region, while the second region overlaps the first region, with respect to the respective second boundaries of the first regions of the at least one object and the other object.

42. The method of claim 40, wherein the instituting of the predetermined operation is further based on a measured amount of time an overlapping of the first region and the second region is maintained, such that the predetermined operation differently controls interaction with objects within the first region based on the measured amount of time.

43. The method of claim 42, wherein the different controlled interactions include controlling an object within the first region closest to the second region differently from remaining objects within the first region, such that control of the remaining objects is ceased after another measured amount of time and only control of the closest object is maintained.

44. The method of claim 43, wherein the controlled interaction includes playing audio corresponding to each object within the first region, such that after the measured amount of time volumes of audio corresponding to the remaining objects are controlled to decrease, and after the other measured amount of time only the audio of the closest object is played.

45. The method of claim 40, wherein the instituting of the predetermined operation is further based on a detected direction orientation of the input device, such that the predetermined operation differently controls interaction with objects within the first region based on the detected orientation.

46. The method of claim 45, wherein the controlled interaction includes playing audio corresponding to each object within the first region based on the detected orientation, such that a volume for audio corresponding to at least one object within the first region is controlled based upon a changing of the direction orientation of the input device.

47. The method of claim 35, wherein the instituting of the predetermined operation is further based on a detected direction orientation of the input device.

48. The method of claim 47, wherein the controlled interaction includes playing audio corresponding to the at least one object based on the detected orientation, such that a volume for audio corresponding to the at least one object is controlled based upon a changing of the direction orientation of the input device.

49. The method of claim 35, wherein, when the selected at least one object is an object associated with a media file, the media file is controlled to be played upon the at least one object being selected.

50. The method of claim 49, wherein the instituting of the predetermined further operation comprises playing only a portion of the media file.

51. The method of claim 50, wherein the portion of the media file is a predetermined portion of the media file determined before selection of the at least one object.

52. The method of claim 49, wherein the instituting of the predetermined operation further comprises adjusting a volume of the media file based on the second comparison of the defined first region and the second region.

53. The method of claim 49, wherein a first input signal is received from the input device and a second input signal is received from another device, such that the performing comprises controlling a display of file information associated with the media file based on a determined relationship between another second region corresponding to the second input signal and the first region, while the at least one object is maintained selected.

54. The method of claim 35, wherein, when the selected at least one object includes an object associated with a document file, the instituting of the predetermined operation comprises displaying at least one of a content of the document file and file information associated with the document file based on the second comparison of the defined first region and the second region.

55. The method of claim 54, wherein the instituting of the predetermined operation further comprises controlling the display of the content and file information to be adjusted to display at least one of an amount of the content of the document file and an amount of the file information associated with the document file based on the second comparison of the defined first region and the second region.

56. The method of claim 54, wherein the file information comprises at least one of a title, an abstract, and a keyword and the adjusting of the display includes adjusting the display to selectively display the title, abstract, and keyword of the file information.

57. The method of claim 35, wherein the selection of the at least one object occurs only after a predetermined period of time lapses after the first comparison of the defined first region and the second region determines that the object should be selected.

58. The method of claim 35, wherein the instituting of the predetermined operation further comprises instituting the predetermined operation with information represented by the selected at least one object based on the defined first region and the second region overlapping and a measured amount of time the overlapping of the first region and the second region is maintained.

59. The method of claim 35, wherein, when the selected at least one object includes an object associated with an image file, the instituting of the predetermined operation comprises displaying a preview image of the image file on the display upon the at least one object being selected.

60. The method of claim 35, wherein, when the selected at least one object includes an object associated with a folder that stores a plurality of image files, the instituting of the predetermined operation further comprises displaying a preview image of at least one image file among the plurality of image files based on the second comparison of the defined first region and the second region.

61. The method of claim 60, wherein the instituting of the predetermined operation comprises adjusting a number of preview images to be displayed on the display, based on the second comparison of the defined first region and the second region.

62. The method of claim 35, further comprising storing position information of at least one of the first region and the second region in a database, including storing a list of currently selected objects, and wherein the instituting of the predetermined operation for the at least one object further comprises instituting operations for at least one of the currently selected objects based on the stored list.

63. The method of claim 62, wherein the list of currently selected objects includes a listing of objects whose respective first regions, defining respective position areas for each object, do not overlap.

64. A non-transitory computer-readable recording medium storing a program to control at least one processing device to implement the method of claim 35.

* * * * *

UNITED STATES PATENT AND TRADEMARK OFFICE
CERTIFICATE OF CORRECTION

| | | |
|---|---|---|
| PATENT NO. | : 8,843,529 B2 | Page 1 of 1 |
| APPLICATION NO. | : 12/585383 | |
| DATED | : September 23, 2014 | |
| INVENTOR(S) | : Jae Joon Han et al. | |

It is certified that error appears in the above-identified patent and that said Letters Patent is hereby corrected as shown below:

In the Claims

Column 21, Line 55, In Claim 50, delete "further operation" and insert -- operation further --, therefor.

Signed and Sealed this
Sixth Day of January, 2015

Michelle K. Lee
*Deputy Director of the United States Patent and Trademark Office*